(12) United States Patent
Sarv

(10) Patent No.: US 7,491,055 B2
(45) Date of Patent: Feb. 17, 2009

(54) OXY-FUEL REBURN: A METHOD FOR $NO_x$ REDUCTION BY FUEL REBURNING WITH OXYGEN

(75) Inventor: Hamid Sarv, Canton, OH (US)

(73) Assignee: Babcock & Wilcox Power Generation Group, Inc.

( * ) Notice: Subject to any disclaimer, the term of this patent is extended or adjusted under 35 U.S.C. 154(b) by 308 days.

(21) Appl. No.: 11/183,512

(22) Filed: Jul. 18, 2005

(65) Prior Publication Data
US 2006/0257800 A1   Nov. 16, 2006

Related U.S. Application Data

(60) Provisional application No. 60/679,840, filed on May 11, 2005.

(51) Int. Cl.
*F23D 14/00*   (2006.01)
(52) U.S. Cl. .................. 431/5; 431/10; 431/12
(58) Field of Classification Search .............. 431/5, 431/10, 12
See application file for complete search history.

(56) References Cited

U.S. PATENT DOCUMENTS

| 4,118,171 | A | * | 10/1978 | Flanagan et al. | 431/10 |
| 4,285,664 | A | * | 8/1981 | Voorheis | 431/284 |
| 5,547,368 | A | * | 8/1996 | Slavejkov et al. | 431/8 |
| 5,562,437 | A | * | 10/1996 | Gauthier et al. | 431/10 |
| 5,908,003 | A | * | 6/1999 | Hura et al. | 110/345 |
| 6,206,685 | B1 | * | 3/2001 | Zamansky et al. | 431/4 |

* cited by examiner

*Primary Examiner*—Alfred Basichas
(74) *Attorney, Agent, or Firm*—Michael J. Seymour; Eric Marica

(57) ABSTRACT

A method is disclosed for reducing the $NO_x$ emission of fossil fuel burners. The method creates fuel-rich and fuel-lean zones within the boiler to enhance the removal of $NO_x$ species by creating a plurality of $NO_x$ reducing precursors.

3 Claims, 2 Drawing Sheets

Oxy-fuel reburning

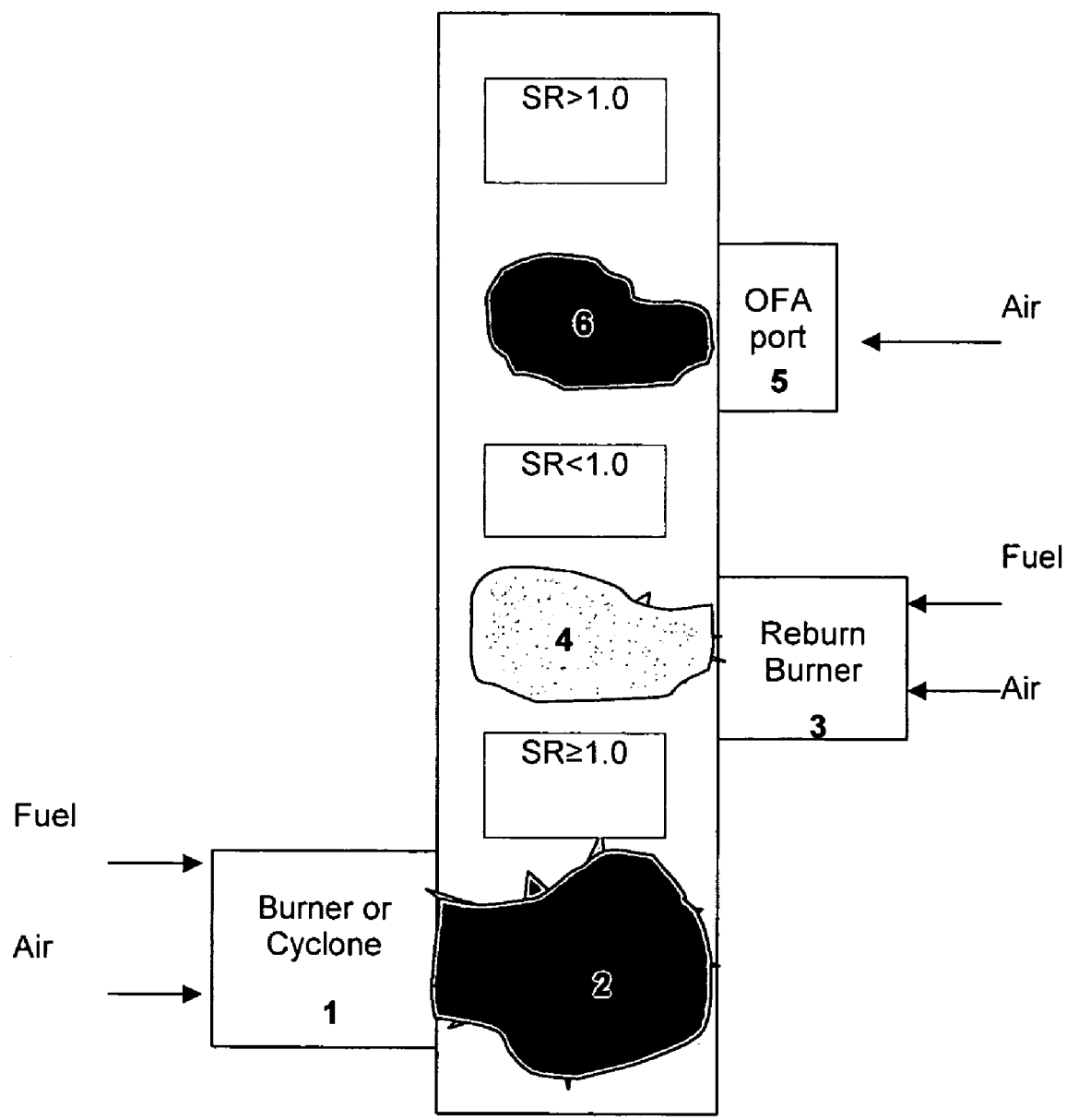
Fig. 1 Conventional reburning

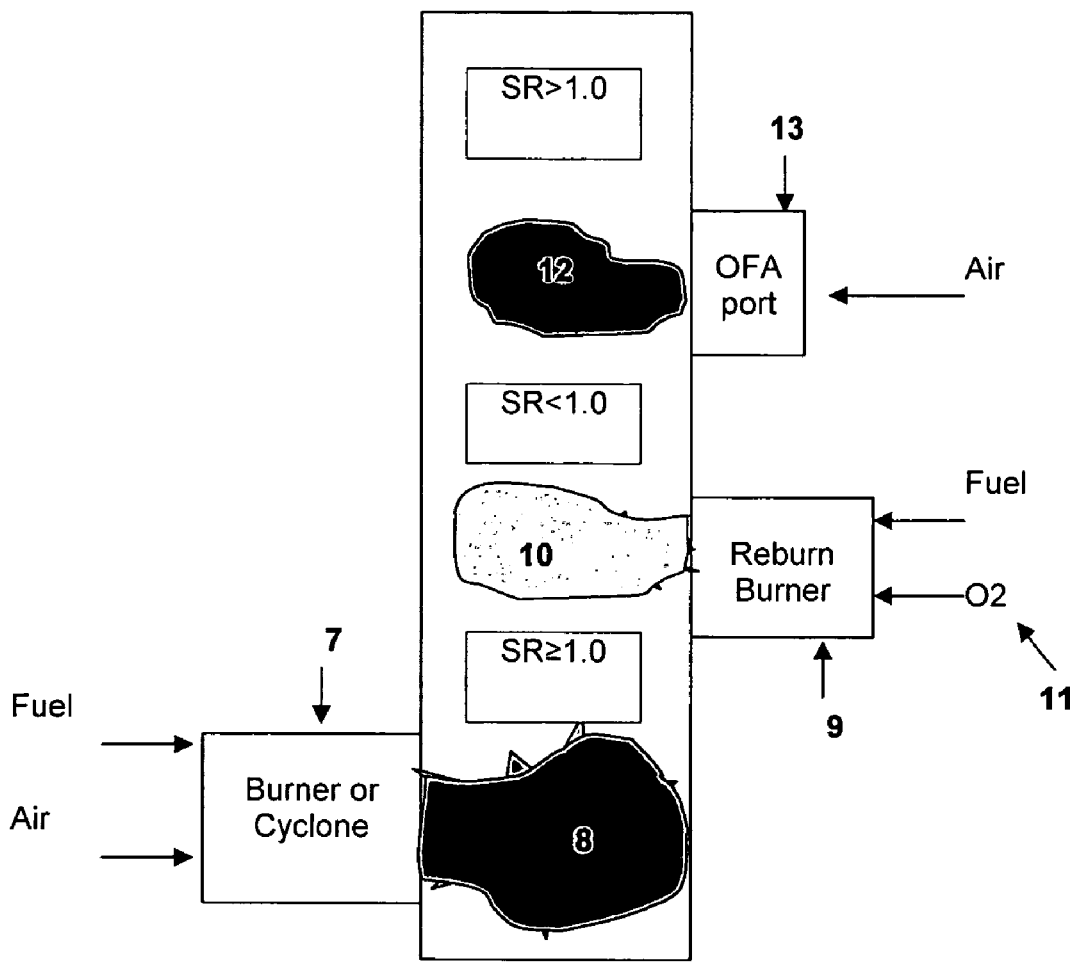
Fig. 2 Oxy-fuel reburning
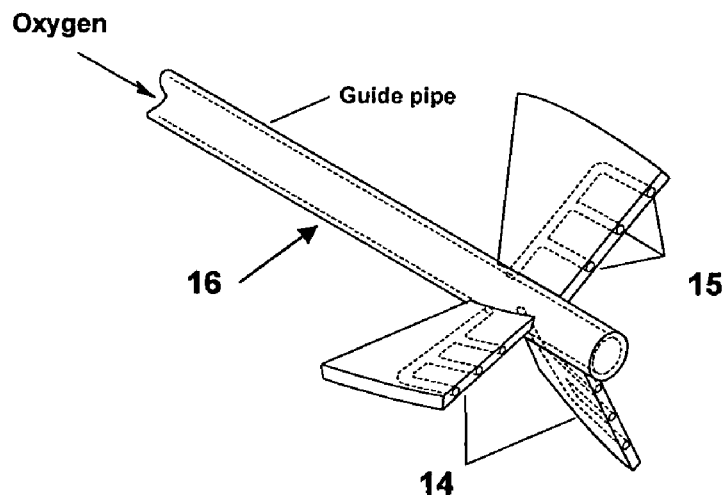
Fig. 3 Oxygen injection device

OXY-FUEL REBURN: A METHOD FOR NO$_x$ REDUCTION BY FUEL REBURNING WITH OXYGEN

CROSS REFERENCE TO RELATED APPLICATIONS

This application claims the benefit under 35 U.S.C. §119 (e) of U.S. Provisional Application No. 60/679,840 filed May 11, 2005, which is herein incorporated by reference in its entirety.

FIELD AND BACKGROUND OF THE INVENTION

The present invention relates generally to the field of NO$_x$ emissions control in fossil fuel-burning boilers, and, in particular, to a new and useful method of reducing NO$_x$ emissions by fuel reburning with oxygen.

The combustion of fossil fuels generates oxides of nitrogen, such as NO and NO$_2$, cumulatively referred to as NO$_x$. Emissions of NO$_x$ in the atmosphere are increasingly becoming a health and environmental concern. The U.S. Environmental Protection Agency (EPA) has determined that regulation of NO$_x$ emissions is necessary and appropriate, thereby creating an urgent need to develop more efficient NO$_x$ emissions control technologies.

In a conventional fossil fuel combustor, combustion air and a fossil fuel are mixed and provided to a main flame zone within a furnace. NO$_x$, a byproduct of the combustion, is formed when naturally occurring nitrogen in the fuel and/or molecular nitrogen in the combustion air oxidize.

Fuel reburning is a technology capable of reducing NO$_x$ emissions. The technology includes providing an oxygen-deficient secondary combustion reburn zone above an oxygen-rich main combustion zone. Supplementary fuel provided to the reburn zone generates hydrocarbon radicals, amines, and cyanic species that react with incoming main combustion products to convert NO$_x$ to N$_2$. Additional air may then be provided by overfire air (OFA) ports, placed above the reburn zone, to burn combust the remaining fuel and combustible gases.

Fuel reburn applications generally utilize flue gas recirculation (FGR) technology to reduce NO$_x$ emission. Flue gas from downstream of boiler is recirculated via conduits back to the secondary combustion zone as an oxygen-lean carrier gas, thereby maintaining a fuel-rich environment and enhancing the fuel penetration and mixing with the main combustion zone gases and products. Quenching, resulting from utilizing flue gas from downstream of the boiler outlet as a carrier gas, further inhibits NO$_x$ formation in the reburn zone.

SUMMARY OF THE INVENTION

It is an objective of the present invention to provide a method of NO$_x$ reduction by fuel reburning with oxygen that exceeds NO$_x$ reduction levels achieved with conventional reburning.

It is further objective of the present invention to provide a method for NO$_x$ reduction including combusting fuel with oxygen in a reburn zone located downstream of a main combustion zone wherein air is combusted with a fossil fuel.

It is another objective of the present invention to provide a method for NO$_x$ reduction suitable for use with both wall-fired and cyclone fired boiler configurations.

A method of NO$_x$ reduction according to the present invention comprises the steps of creating a first combustion zone by combusting a first fuel with a first air stream, wherein the first combustion zone is provided with an excess of the first air stream to produce a fuel-lean combustion environment, producing a plurality of NO$_x$ species in the first combustion zone, creating a reburn zone downstream of the first combustion zone by combusting a second fuel with an oxygen stream, wherein the reburn zone is provided with an excess of the second fuel to produce a fuel-rich combustion environment, producing a plurality of NO$_x$ reducing precursors in the reburn zone during combustion, and reacting the plurality of NO$_x$ reducing precursors with NO$_x$ produced in first combustion zone, wherein a substantial portion of the NO$_x$ is converted to molecular nitrogen.

A method of NO$_x$ reduction according to the present invention provides additional benefits over that of conventional reburning including but not limited to higher flame temperature via reducing the dilutent effect of nitrogen and other inert gases present in air, enhanced fuel pyrolysis, enhanced production of NO$_x$ precursors, and improved char burnout.

The various features of novelty which characterize the present invention are pointed out with particularity in the claims annexed to and forming a part of this disclosure. For a better understanding of the invention, its operating advantages and specific benefits attained by its uses, reference is made to the accompanying drawings and descriptive matter in which the preferred embodiments of the invention are illustrated.

BRIEF DESCRIPTION OF THE DRAWINGS

FIG. 1 is a schematic diagram of a conventional fuel reburning method.

FIG. 2 is a schematic diagram of an oxygen fuel reburning NO$_x$ emission reducing method in accordance with an embodiment of the present invention.

FIG. 3 is a schematic view of a oxygen fuel delivery means capable of being used in an embodiment of the present invention.

DESCRIPTION OF THE PREFERRED EMBODIMENTS

Referring to the drawings, generally where like numerals designate the same or functionally similar features, throughout the several views and first to FIG. 1, there is shown a schematic diagram view of a conventional fuel reburning method. Fuel and air are supplied to the boiler via burner apparatus 1 and combusted, forming a combustion zone 2. Excess air is generally supplied to the combustion zone in order to create a fuel-lean environment having a stoichiometric ratio (oxidant-to-fuel basis) above about 1.0.

A second fuel and air stream are supplied to the boiler via a second burner apparatus 3 and combusted, forming a fuel-rich reburn zone 4 downstream of the combustion zone 2 having a combined stoichiometric ratio below about 1.0.

A third air stream is supplied to the boiler via an overfire air port 5, forming a burnout zone 6, wherein the third air stream combusts remaining combustible matter for complete combustion.

Referring now to FIG. 2, a schematic diagram of an oxygen fuel reburning NO$_x$ emission reducing method in accordance with the present invention is shown. A first fuel and first air stream are supplied to the boiler via a burner apparatus 7 and combusted, forming a combustion zone 8. Excess first air is generally supplied to the combustion zone in order to create a fuel-lean environment having a stoichiometric ratio of about 1.0, and preferably between about 0.9 and about 1.2.

A second fuel and an oxygen stream are supplied to the boiler via a second burner apparatus 9 and combusted, forming a fuel-rich reburn zone 10 downstream of the combustion zone 9 having a combined stoichiometric ratio below about 1.0, and preferably between about 0.6 and 1.0.

Injection of an oxygen stream into the reburn zone 10 increases the local flame temperature via reducing the diluent effect of nitrogen and other inert gas of which air comprises. Higher flame temperature enhances fuel pyrolysis and generation of $NO_x$ reducing precursors, including but not limited to hydrocarbon radicals, amines, and cyanic compounds.

Increased $NO_x$ reducing precursors concentrations facilitate improved removal of $NO_x$ emission generated in the combustion zone 8. Additional $NO_x$ emissions generated in the reburn zone 10 are minimized as nitrogen introduced though the prior art air stream is no longer present, thus not capable of producing $NO_x$ emissions which would otherwise compete for the limited supply of $NO_x$ reducing precursors generated.

In an alternative embodiment of the present invention a burnout zone 12 may be positioned downstream of the reburn zone 10 for combusting remaining combustible matter not combusted in either the combustion zone 8 or reburn zone 10. The burnout zone 12 may be formed by providing a second air stream to an overfire air port 13, and allowing combustion of remaining combustibles to ensue.

In another alternative embodiment, pulverized coal may be utilized as the second fuel and provided to the reburn burner 9 via a carrier gas. The second fuel carrier gas can be air, oxygen, recirculated flue gas, or any other gas known to one of skill in the boiler arts. Conduits may be installed anywhere along the boiler system, in recirculated flue gas embodiments, to allow desired quantities of flue gas to be recirculated into the boiler and obtain further $NO_x$ reduction via quenching of the reburn zone 10. The oxygen stream can then be premixed with the recirculated flue gas, or injected via an oxygen delivery means into the reburn zone 10.

In another alternative embodiment of the present invention oxygen is delivered to the reburn zone 10 by an oxygen delivery means inside a reburn burner 9. The oxygen deliver means may be any spud or lance commonly know in the art. Alternatively, referring to FIG. 3, the oxygen deliver means may by a multi-bladed injection device wherein oxygen is provided to the reburn zone 10 through a plurality of hollow blade conduits 14 in fluid connection with a hollow guide pipe conduit 15.

In another embodiment wherein fuel oil is used as the second fuel, fuel oil can be sprayed into the reburn zone 10 using oxygen as the atomizing medium.

In yet another embodiment natural gas or other gaseous fuels can be injected with oxygen by separate delivery means within a reburn burner 9.

The invention claimed is:

1. A method of reducing $NO_x$ emission consisting of the steps of:
    creating a first combustion zone by combusting a first fuel with a first air stream, wherein the first combustion zone is provided with an excess of the first air stream to produce a fuel-lean combustion environment,
    producing a plurality of $NO_x$ species in the first combustion zone,
    creating a reburn zone downstream of the first combustion zone by combusting a second fuel with a oxygen stream, wherein the reburn zone is provided with an excess of the second fuel to produce a fuel-rich combustion environment having a stoichiometric ratio between about 0.6 and about 0.70,
    increasing the local flame temperature and producing a plurality of $NO_x$ reducing precursors in the reburn zone during combustion, and
    reacting the plurality of $NO_x$ reducing precursors with $NO_x$ produced in first combustion zone, wherein a substantial portion of the $NO_x$ is converted to molecular nitrogen.

2. A method of reducing $NO_x$ emission consisting of the steps of:
    creating a first combustion zone by combusting a first fuel with a first air stream, wherein the first combustion zone is provided with an excess of the first air stream to produce a fuel-lean combustion environment,
    producing a plurality of $NO_x$ species in the first combustion zone,
    creating a reburn zone downstream of the first combustion zone by combusting a second fuel with a oxygen stream, wherein the reburn zone is provided with an excess of the second fuel to produce a fuel-rich combustion environment having a stoichiometric ratio between about 0.6 and about 0.70,
    increasing the local flame temperature and producing a plurality of $NO_x$ reducing precursors in the reburn zone during combustion, and
    reacting the plurality of $NO_x$ reducing precursors with $NO_x$ produced in first combustion zone, wherein a substantial portion of the $NO_x$ is converted to molecular nitrogen,
    creating a burnout zone downstream of the reburn zone,
    utilizing an overfire air port to provide a second air stream to burnout zone, and
    combusting a substantial portion of the uncombusted second fuel with the second air stream in the burnout zone.

3. A method of reducing $NO_x$ emission consisting of the steps of:
    creating a first combustion zone by combusting a first fuel with a first air stream, wherein the first combustion zone is provided with an excess of the first air stream to produce a fuel-lean combustion environment,
    producing a plurality of $NO_x$ species in the first combustion zone,
    creating a reburn zone downstream of the first combustion zone by combusting a second fuel with a oxygen stream, wherein the reburn zone is provided with an excess of the second fuel to produce a fuel-rich combustion environment having a stoichiometric ratio between about 0.6 and about 0.70,
    increasing the local flame temperature and producing a plurality of $NO_x$ reducing precursors in the reburn zone during combustion, and
    reacting the plurality of $NO_x$ reducing precursors with $NO_x$ produced in first combustion zone, wherein a substantial portion of the $NO_x$ is converted to molecular nitrogen,
    creating a burnout zone downstream of the reburn zone,
    utilizing an overfire air port to provide a second air stream to burnout zone, wherein the step of providing a second air stream creates a stoichiometric ratio between about 1.0 and 1.2 in the burnout zone, and combusting a substantial portion of the uncombusted second fuel with the second air stream in the burnout zone.

* * * * *